Sept. 16, 1969　　　P. B. ZOLLETT　　　3,467,090
SELF-RETAINING OCCLUSIVE STEM PESSARY
Filed May 3, 1967
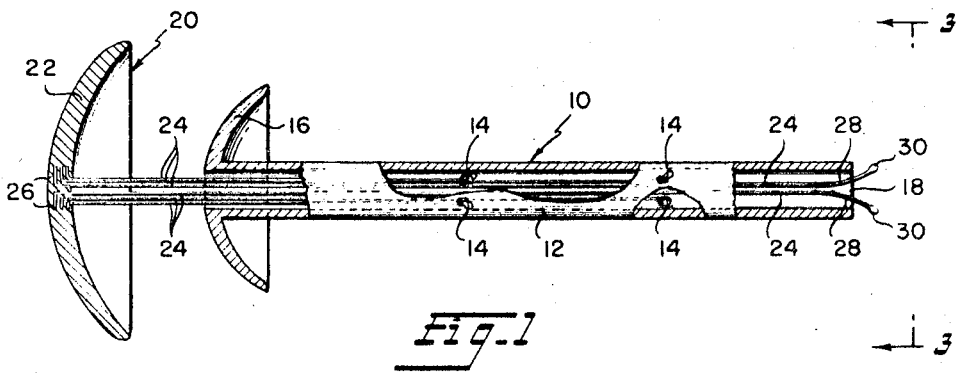
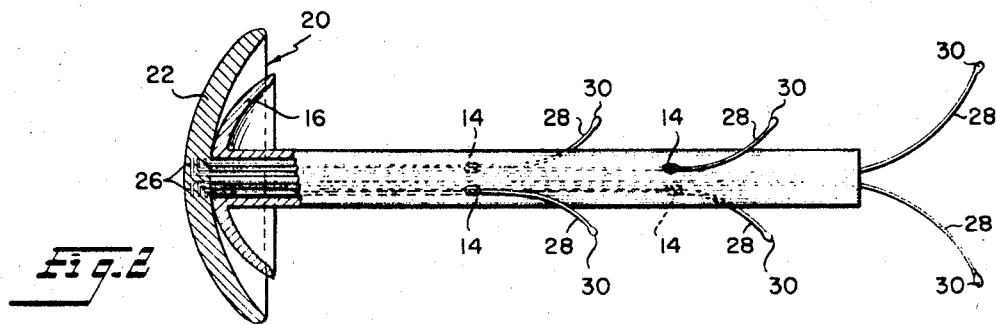
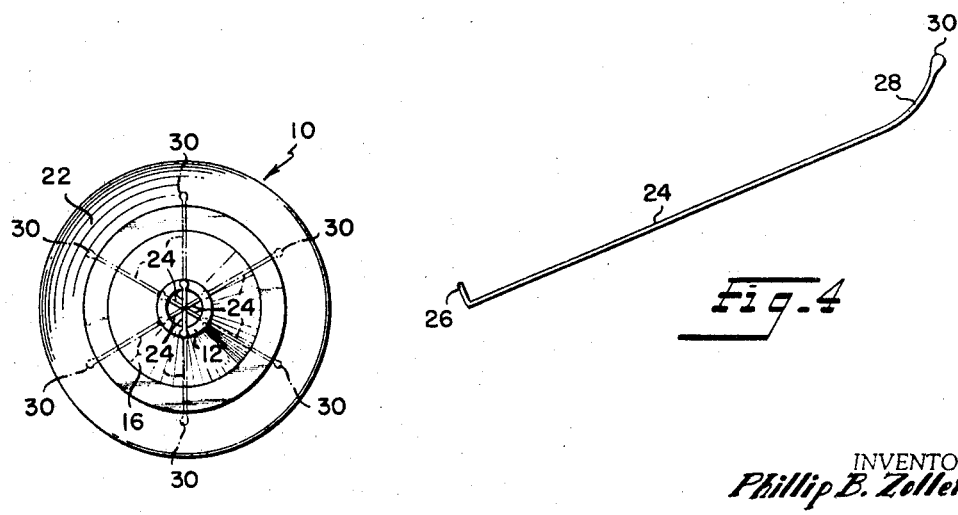
INVENTOR
Phillip B. Zollett
BY
ATTORNEYS

United States Patent Office 3,467,090
Patented Sept. 16, 1969

3,467,090
SELF-RETAINING OCCLUSIVE STEM
PESSARY
Phillip B. Zollett, 28 S. Clinton St.,
Middletown, Ohio 45042
Filed May 3, 1967, Ser. No. 635,876
Int. Cl. A61f 5/46
U.S. Cl. 128—131                                     12 Claims

ABSTRACT OF THE DISCLOSURE

A pessary comprising a slender elongated sleeve having a series of openings in the wall thereof and an insert slidably mounted in one end of the sleeve which insert has an operating and non-operating position and which insert includes a circular base member radially extending beyond the end of the sleeve which base member occludes the end when in the operating position and which insert further has a plurality of flexible feelers extending from the base into the end of the tube which project outwardly through the openings in the sleeve a substantial distance only when the insert is in the operating position.

---

This invention relates to self-retaining stem pessaries which can be inserted into the cervical canal (mouth of the uterus) and more particularly to a pessary which when locked in place forms a barrier between the vagina and the cervical canal.

Objects and summary

It is therefore an object of this invention to provide a pessary which is inexpensive to manufacture and which may be inserted easily with a minimum of discomfort.

Another object of this invention is to provide a pessary which will prevent the entrance of bacterial infection into the pelvic cavity.

Another object of this invention is to prevent infection of the fallopian tubes which are usually involved in 98% of gonococcal infections which infections result in ectopic pregnancy.

Another object of this invention is to provide a pessary which by general pressure helps maintain normal flexion of the cervix.

Another object of this invention is to provide a pessary which will not interfere with the flow of discharge.

Another object of this invention is to provide a pessary which need be maintained in contact with living tissue for only short intervals of time.

Another object of this invention is to provide a pessary which does not easily loosen or slip once inserted which thereby prevents the entrance of bacteria or other foreign material from entering into the uterus, tubes and pelvic cavity.

Yet a still further object of this invention is to provide a pessary which may be easily removed by ordinary forceps thus avoiding the necessity of having to provide a special instrument for removing.

In general, this invention relates to a two-part pessary having an outer sleeve and an insert therefore having a series of feelers which extend through openings in the side wall of the sleeve so that when the insert is moved into the sleeve, the feelers are moved outwardly from the wall of the sleeve into positive engagement with the cervical canal.

These and other objects of this invention will be apparent from the following description and claims. In the accompanying drawings which illustrate by way of example various embodiments of this invention:

FIGURE 1 is a side elevational view showing portions broken away and portions in cross sections illustrating the invention in non-operating position;

FIGURE 2 is a side elevational view with portions broken away and in cross section showing the invention in operating position;

FIGURE 3 is an end view taken along the lines 3—3 of FIGURE 1 and viewed in the direction of the arrows:

FIGURE 4 is a plan view showing one of the feeler members used in the invention.

The pessary 10 comprises a hollow tube of sleeve 12 having a series of geometrically positioned openings 14 in the wall thereof. The openings 14 are arranged in pairs which are diametrically opposed from each other on opposite sides of the wall of the sleeve 12.

As shown in the figures, one end of the sleeve 12 is provided with a base member 16 which extends radially outwardly from the sleeve and has a generally concavo-convex appearance. The base member 16 in width is about ⅓ (one-third) of the length of the sleeve 12. The opposite end of the sleeve 12 is provided with an end opening 18.

An insert member 20 is provided with a base member 22 which has a generally concavo-convex head. The diameter of the base member 22 is greater than that of the base member 16 and the curvature of the concave surface is such that the base member 16 nestles substantially within the base member 22 when the insert member 20 is in operating position within the sleeve 12.

The base member 22 is provided with a plurality of feeler members 24 which are set or embedded or otherwise secured to the center portion of the base member 22. The feeler members as best illustrated in FIGURE 4 are shown with a right angle bend 26 as best illustrated in FIGURE 4 primarily for the purpose of locking the members positively into the base member 22. If desired, the base member 22 may be cast or molded or otherwise formed about the right angle bends 26 to permanently secure the same in the base member 22. The insert member 20 comprising the base member 22 and the feelers 24 is slidably mounted within the sleeve 12. It will be noted that the feelers 24 are assembled in pairs. Each feeler of a pair is the same length and successive pairs of feelers when mounted within the sleeve 12, are longer than the succeeding pair when viewed from left to right in the drawings. It will be further noted that the feelers radiate in a spokewise fashion as best illustrated in FIGURE 3. The phantom lines show the feelers when in extended position in FIGURE 3. The last pair of feelers 24 extend from the end opening 18 of the sleeve 12. All of the feelers 24 may be provided with a bend 28 as best illustrated in FIGURE 4 and in any event, the feelers which extend from the end opening 18 must be provided with bends 28 for purposes here and after described.

It should be noted that the feelers 24, as best illustrated in FIGURE 3, radiate outwardly the same distance when the insert member 20 is positioned operatively in the sleeve 12.

The openings 18 in general are slightly larger than the largest diameter of the feelers 24 in order to permit them to be passed therethrough for proper operation. The feelers 24 may be provided with beaded tips 30. These tips 30 may be formed initially on the feelers 24 or may be provided on the feelers after they have been inserted through the openings 14 or the end opening 18. The may be molded on or otherwise formed integrally with the feeler 24. These tips though not absolutely essential, nevertheless, tend to eliminate irritation and discomfort as will be obvious from the description here and after made. From the standpoint of preventing the sleeve 12 from separating from the insert 20, it is suggested that the diameter of the beads or tips 30 be slightly larger than the openings 14 and that these beads or tips 30 be molded or otherwise positioned on the feelers 24 after the insert member 20 has been positioned within the sleeve 12 of the pessary 10.

Operation

When the pessary 10 is inserted into the cervical canal, it is in the non-operating position best illustrated in FIGURE 1. After insertion, the base member 16 of the sleeve 12 will fit snugly against the outer portion of the cervix and the base 22 of the insert member will then be pushed into position so that it completely covers or occludes the base 16. The action of pushing on the base 22 of the insert member 20 activates the feelers 24 to move outwardly from their openings 14 and 18 to apply flexing pressure against the wall of the canal. The feelers 24 are flexible and preformed (FIGURE 2).

All of the parts of the pessary 10 will be constructed of non-irritating materials such as stainless steel or plastic which is of a non-irritating type. Ordinary material may be used which is coated with a non-irritating type plastic such as neoprene 1–420 (virgin material). This composition has been found to be quite non-irritating and to resist deterioration better in body secretions.

The pessary when completely locked into place, separates the vagina from the cervical canal, and closes the same.

In general, the insert would comprise 6 (six) feelers though possibly more feelers might be desirable for certain conditions. When the insert 20 is in the operating position within the sleeve 12, the feelers 24 are directed in an outward manner insuring constant positioning of the circular base 16 and 22. The feelers prevent slipping which if it occurs may allow penetration of infective bacteria into the body of the uterus, fallopian tubes and the pelvic cavity.

In general the pessary 10 will be in contact with living tissue for relatively short intervals of time.

Prior to the menstrual cycle, the patient would remove the pessary. This would allow proper cleansing of the area and cleaning of the pessary. It would also eliminate the constant pressure even though it is of a non-irritating material. At the termination of each menstrual cycle, the physician will reinsert the pessary. This would assure proper placement and use under medical supervision.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:
1. A pessary comprising:
   (a) a slender elongated sleeve,
   (b) said sleeve having a series of openings in the wall thereof,
   (c) an insert slidably mounted in one end of said sleeve and having operating and non-operating positions,
   (d) said insert having a circular base member radially extending beyond said one end of said sleeve and occluding said one end when in operating position, and
   (e) said insert having a plurality of flexible feelers extending from said base into said one end of said tube and projecting outwardly through said openings a substantial distance only when said insert is in the operating position.
2. A pessary as in claim 1 and wherein:
   (a) said openings in said sleeve are geometrically spaced.
3. A pessary as in claim 1 and wherein:
   (a) said series of openings include at least one pair of circumferentially spaced openings located approximately the same distance from said one end of said sleeve.
4. A pessary as in claim 1 and wherein:
   (a) said feelers project outwardly through said openings substantially the same distance when said insert is in operating position.
5. A pessary as in claim 1 and wherein:
   (a) said insert includes a pair of feelers projecting from the other end of said sleeve and in a radial direction outwardly when said insert is in operating position, and
   (b) said pair of feelers being substantially equal in length.
6. A pessary as in claim 5 and wherein:
   (a) all of said feelers have enlarged tips.
7. A pessary as in claim 1 and wherein:
   (a) said one end of said sleeve includes a circular base member, and
   (b) said circular base member of said sleeve is substantially contained within said circular base member of said insert when said insert is in operating position.
8. A pessary as in claim 1 and wherein:
   (a) at least some of said flexible feelers have pre-set bends therein.
9. A pessary as in claim 8 and wherein:
   (a) said flexible feelers include a series of successively longer equi-length pairs.
10. A pessary as in claim 1 and wherein:
    (a) said series of openings includes at least four openings arranged in circumferentially spaced diametrically opposed pairs.
11. A pessary as in claim 10 and wherein:
    (a) said insert includes a pair of feelers extending out of the other end of said sleeve a distance equal to the distance of extension of said feelers projecting outwardly through said openings when said insert is in operating position.
12. A pessary as in claim 1 and wherein:
    (a) said feelers are practically flush with the outside wall of said sleeve when said insert is in non-operating position.

References Cited

UNITED STATES PATENTS 2,398,518  4/1946  Clark _____ 128—131
2,564,177  8/1951  Schmitt _____ 128—131

ADELE M. EAGER, Primary Examiner

U.S. Cl. X.R.

128—224, 341